United States Patent
Payne et al.

(10) Patent No.: US 11,927,293 B2
(45) Date of Patent: Mar. 12, 2024

(54) COUPLER DOOR PUSH BUTTON RELEASE FOR AGRICULTURAL VEHICLE

(71) Applicant: CNH Industrial America LLC, New Holland, PA (US)

(72) Inventors: Brian Payne, Darien, IL (US); Gerard Restaino, III, Dolton, IL (US); Jerry L Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 244 days.

(21) Appl. No.: 17/554,613

(22) Filed: Dec. 17, 2021

(65) Prior Publication Data

US 2023/0194034 A1 Jun. 22, 2023

(51) Int. Cl.
*F16L 55/24* (2006.01)
*B62D 25/24* (2006.01)

(52) U.S. Cl.
CPC .............. *F16L 55/24* (2013.01); *B62D 25/24* (2013.01); *F16L 2201/80* (2013.01)

(58) Field of Classification Search
CPC ..... F16L 55/24; F16L 2201/80; F16L 55/115; F16L 35/00; F16L 39/00; B62D 25/24; B60D 1/00
See application file for complete search history.

(56) References Cited

U.S. PATENT DOCUMENTS

| | | | |
|---|---|---|---|
| 2,213,814 A | 9/1940 | Jacobi | |
| 2,562,038 A | 7/1951 | Jacobi | |
| 2,602,319 A | 7/1952 | Jacobi | |

(Continued)

FOREIGN PATENT DOCUMENTS

| | | | | |
|---|---|---|---|---|
| CN | 110091709 A | * | 8/2019 | .............. B60K 15/05 |
| DE | 202011005089 U1 | * | 9/2011 | .............. F16L 35/00 |
| EP | 1568932 A1 | * | 8/2005 | .............. F16L 39/00 |
| ES | 1216999 U | * | 9/2018 | |
| WO | 01/69618 A1 | | 9/2001 | |

OTHER PUBLICATIONS

Website Parker, "Agricultural Tractor Clamp Kits with Pioneer Lever Actuated Quick Couplers and Dust Cover Housing—9500 Series Clamp Kits", taken from https://ph.parker.com/us/en/pioneer-agricultural-quick-coupler-clamp-kits-hydraulic-up-to-3000-psi-iso-5675-9500-series, Aug. 12, 2021 (2 pages).

*Primary Examiner* — Drew J Brown
(74) *Attorney, Agent, or Firm* — Rickard K. DeMille; Rebecca L. Henkel

(57) ABSTRACT

A locking assembly for a door assembly of an agricultural vehicle includes: an actuator that defines an actuator axis and is linearly movable between a first position and a second position and rotatable about the actuator axis between a first locking orientation and a second locking orientation and includes a pair of locking features; a biaser configured to bias the actuator toward the first position; an energizer configured to bias the actuator toward the first locking orientation when the actuator is in the second locking orientation; and a lock configured to engage a second locking feature when the actuator is in the second locking orientation. Linear movement of the actuator from the first position to the second position while the actuator is in the second locking orientation causes the lock to disengage from the second locking feature so the energizer rotates the actuator towards the first locking orientation.

20 Claims, 5 Drawing Sheets

(56) References Cited

U.S. PATENT DOCUMENTS

| | | |
|---|---|---|
| 3,026,385 A | 3/1962 | Davis et al. |
| 3,767,877 A | 10/1973 | Palman |
| 4,481,977 A * | 11/1984 | Maldavs ............... F16L 35/00 |
| | | 138/89.4 |
| 7,155,776 B2 | 1/2007 | Park |
| 7,707,863 B2 | 5/2010 | Tsuchikiri et al. |
| 8,813,313 B2 | 8/2014 | Freitas Marinho et al. |
| 9,412,534 B2 | 8/2016 | Baumann |
| 9,631,398 B1 | 4/2017 | Liu |
| 2009/0218362 A1 | 9/2009 | Gelardi |

\* cited by examiner

COUPLER DOOR PUSH BUTTON RELEASE FOR AGRICULTURAL VEHICLE

FIELD OF THE INVENTION

The present invention pertains to agricultural vehicles and, more specifically, to a locking assembly for a door assembly of an agricultural vehicle.

BACKGROUND OF THE INVENTION

Pull-type agricultural implements have been utilized for various harvesting operations for many years. These implements, supported primarily by ground engaging wheels, are made in a variety of configurations, but normally include components supported on a chassis. One of these components is a pivotal draft member, commonly called a drawbar or a draft tongue. For convenience, any draft member discussed in the following description will be referred to as a draft tongue.

For example, in pull-type harvesting implements, the draft tongue is pivotally mounted to the chassis and is connected at the forward end to an agricultural vehicle, such as a tractor, that provides both motive power and operational power to operate the crop harvesting header. The tractor also provides a source of hydraulic fluid under pressure from a conventional on-board hydraulic system carried by most modern tractors. The hydraulic fluid is needed to provide operative power for hydraulic components on the harvesting implement. The pivotal movement of the draft tongue is controlled by a hydraulic swing cylinder interconnecting the frame and the rearward portion of the draft tongue, which is powered hydraulically by the tractor. Further, hydraulic lift cylinders and hydraulic tilt cylinders, control the height and pitch of the crop harvesting header relative to the ground.

Hydraulic fluid is typically transported to and from the implement via a hydraulic conduit system that includes at least one flexible hose extending from the forward end of the draft tongue to the tractor. The flexible hoses are typically connected to openings of a coupler that couple the hoses to the hydraulic system for delivery of hydraulic fluid. When the hoses are disconnected, the openings are typically covered by a door or similar element to reduce the risk of dust and other contaminants entering the hydraulic system. While the doors are effective to cover the openings when the hoses are disconnected, the doors are frequently broken during coupling and uncoupling of the hoses.

What is needed in the art is a way to reduce the risk of covering doors breaking when coupling or uncoupling a hose to a hydraulic system.

SUMMARY OF THE INVENTION

Exemplary embodiments provided according to the present disclosure include a locking assembly with an actuator that can be unlocked to rotate between two different locking orientations when linearly moved from a first position to a second position.

In some exemplary embodiments provided according to the present disclosure, a door assembly for an agricultural vehicle, the door assembly includes: a mounting plate having a door opening and an actuator opening; a door rotatably coupled to the mounting plate and movable between a covering position where the door covers the door opening and an open position where the door opening is uncovered; and a locking assembly associated with the door. The locking assembly includes: an actuator that defines an actuator axis, the actuator being linearly movable in the actuator opening between a first position and a second position and rotatable about the actuator axis between a first locking orientation and a second locking orientation, the actuator including a first locking feature and a second locking feature; a biaser associated with the actuator and configured to bias the actuator toward the first position; an energizer associated with the actuator and configured to bias the actuator toward the first locking orientation when the actuator is in the second locking orientation; and a lock configured to engage the first locking feature when the actuator is in the first locking orientation and engage the second locking feature when the actuator is in the second locking orientation. Linear movement of the actuator from the first position to the second position while the actuator is in the second locking orientation causes the lock to disengage from the second locking feature so the energizer rotates the actuator towards the first locking orientation.

In some exemplary embodiments provided according to the present disclosure, an agricultural vehicle includes: a chassis; a hydraulic system carried by the chassis and configured to output pressurized hydraulic fluid; and a remote coupler fluidly coupled to the hydraulic system. The remote coupler includes a door assembly including: a mounting plate including a door opening and an actuator opening; a door rotatably coupled to the mounting plate and movable between a covering position where the door covers the door opening and an open position where the door opening is uncovered; and a locking assembly associated with the door. The locking assembly including: an actuator that defines an actuator axis, the actuator being linearly movable in the actuator opening between a first position and a second position and rotatable about the actuator axis between a first locking orientation and a second locking orientation, the actuator including a first locking feature and a second locking feature; a biaser associated with the actuator and configured to bias the actuator toward the first position; an energizer associated with the actuator and configured to bias the actuator toward the first locking orientation when the actuator is in the second locking orientation; and a lock configured to engage the first locking feature when the actuator is in the first locking orientation and engage the second locking feature when the actuator is in the second locking orientation. Linear movement of the actuator from the first position to the second position while the actuator is in the second locking orientation causes the lock to disengage from the second locking feature so the energizer rotates the actuator towards the first locking orientation.

In some exemplary embodiments provided according to the present disclosure, a locking assembly for a door assembly of an agricultural vehicle includes: an actuator that defines an actuator axis, the actuator being linearly movable between a first position and a second position and rotatable about the actuator axis between a first locking orientation and a second locking orientation, the actuator including a first locking feature and a second locking feature; a biaser associated with the actuator and configured to bias the actuator toward the first position; an energizer associated with the actuator and configured to bias the actuator toward the first locking orientation when the actuator is in the second locking orientation; and a lock configured to engage the first locking feature when the actuator is in the first locking orientation and engage the second locking feature when the actuator is in the second locking orientation. Linear movement of the actuator from the first position to the second position while the actuator is in the second locking orientation causes the lock to disengage from the second locking feature so the energizer rotates the actuator towards the first locking orientation.

One possible advantage that may be realized by exemplary embodiments provided according to the present disclosure is that the lock can be disengaged conveniently by pushing on the actuator.

Another possible advantage that may be realized by exemplary embodiments provided according to the present disclosure is that a brake can be incorporated to impede rotation of the actuator from the second locking orientation to the first locking orientation and reduce the speed of the door returning to the covering position, which can reduce the risk of the door being broken.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
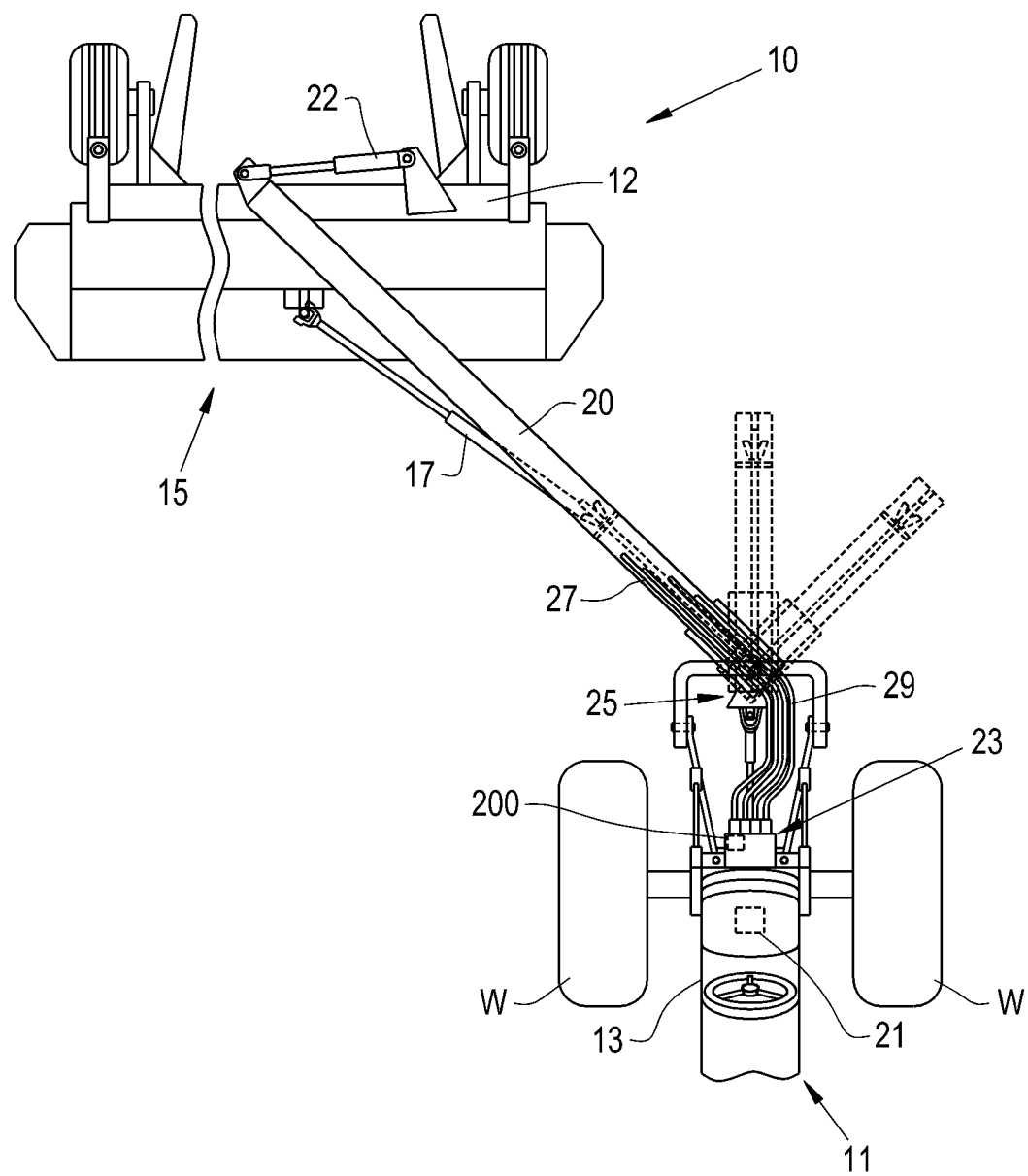
FIG. 1 illustrates a top view of an exemplary embodiment of an agricultural vehicle coupled to an agricultural implement and including a hydraulic system and a remote coupler, provided according to the present disclosure.
Figure 2:
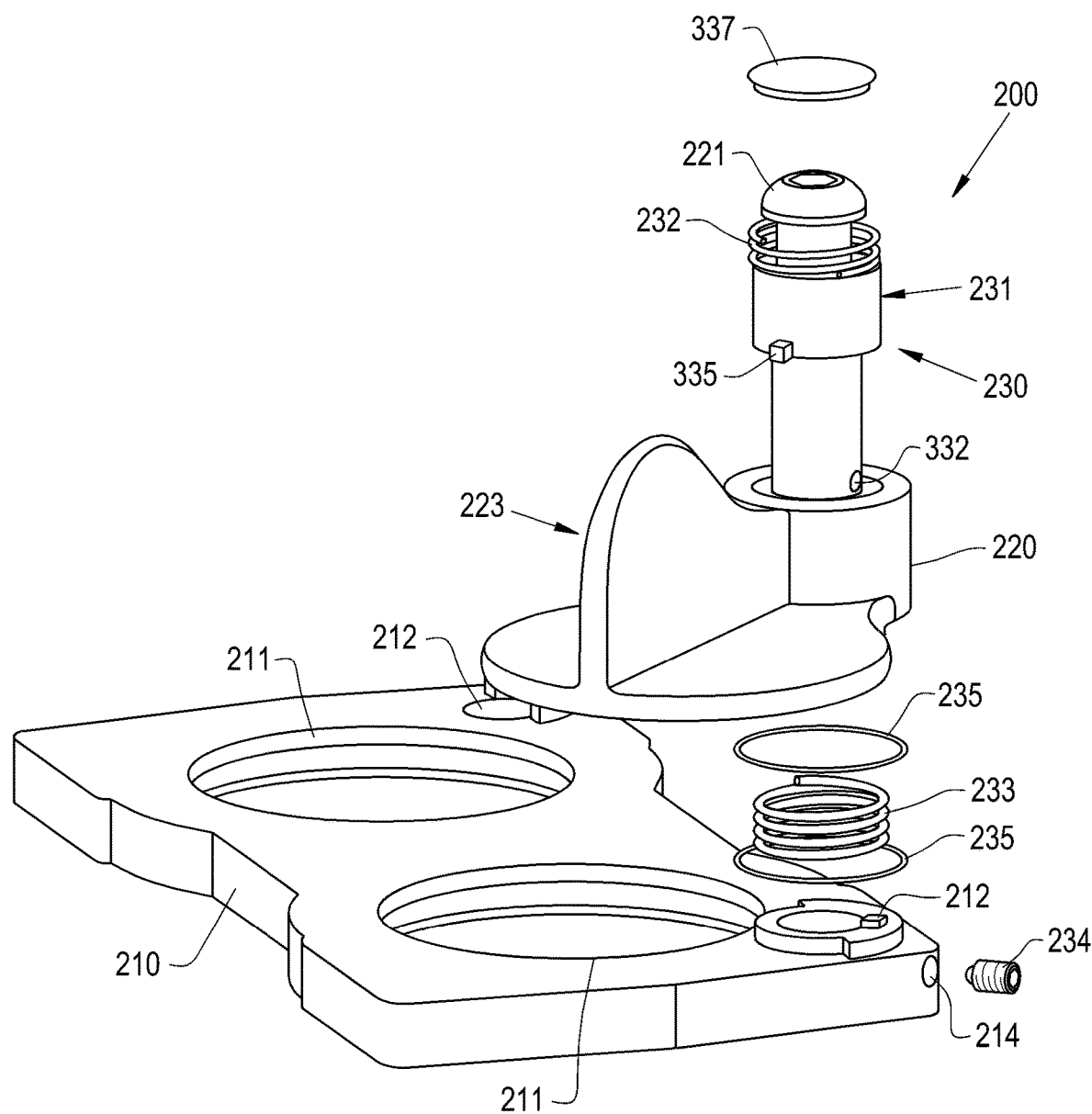
FIG. 2 illustrates an exploded view of an exemplary embodiment of a door assembly of the remote coupler of FIG. 1, provided according to the present disclosure.
Figure 3:
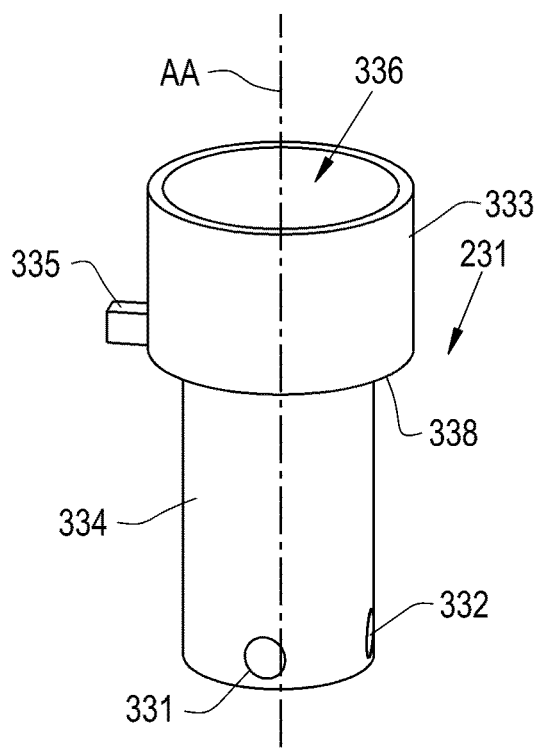
FIG. 3 illustrates a perspective view of an exemplary embodiment of an actuator of the door assembly of FIG. 2.
Figure 5:
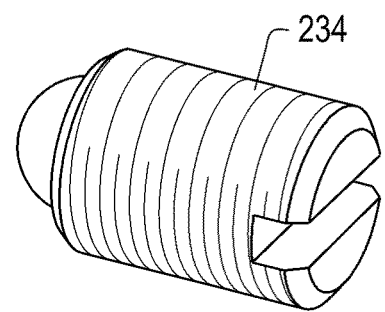
FIG. 5 illustrates a perspective view of an exemplary embodiment of a lock of the door assembly of FIG. 2.

Referring now to the drawings, and more particularly FIG. 1, an exemplary embodiment of an agricultural vehicle system 10 including an agricultural vehicle 11, illustrated as a tractor, coupled to a pull-type agricultural implement 15, illustrated as a mower-conditioner, is illustrated. The agricultural vehicle 11 includes a chassis 13 carrying a couple of wheels W. The mower-conditioner 15, exemplary of pull-type agricultural implements, which could include air seeders, planters and other types of agricultural implements, includes a wheeled frame 12 adapted for movement over the field to harvest hay crop. A crop harvesting header is mounted on the forward portion of the frame 12 to engage standing crop material, sever the crop material from the ground, and further harvest the severed crop material by conditioning the hay crop before discharging the conditioned crop to the ground behind the wheeled frame 12.

Pull-type agricultural implements 15 utilize a draft tongue 20 that is pivotally mounted at the rearward end thereof to the frame 12 and connected at the forward end thereof to the agricultural vehicle 11 that provides both motive power and operational power to operate the crop harvesting header 10. The agricultural vehicle 11 also provides a source of hydraulic fluid under pressure from a conventional on-board hydraulic system 21 that is configured to output pressurized hydraulic fluid. The hydraulic fluid under pressure is needed to provide operative power for hydraulic components on the implement 10. For example, the pivotal movement of the pivoted draft tongue 20 is controlled by a hydraulic swing cylinder 22 interconnecting the frame 12 and the rearward portion of the tongue 20. Other conventional examples of hydraulically controlled components include hydraulic lift cylinders that control the height of the crop harvesting header relative to the ground and a hydraulic tilt cylinder that interconnects the frame 12 and the top of the crop harvesting header to control the pitch of the header relative to the ground.

The implement 10 is typically provided with a hydraulic fluid conduit system 25 including hoses 29 interconnecting the hydraulic system 21 and the hydraulic components 22 of the implement 10 to provide flow communication therebetween. Typically, the conduit system 25 includes fixed length pipes 27 mounted on top of the draft tongue 20. Flexible hoses 29 are typically connected to the ends of the pipes 27 to provide appropriate flow communication connection at each respective end of the pipes 27. An alternative configuration would be for the flexible hoses 29 to extend over top of the draft tongue 20, eliminating the fixed length pipes. The hoses 29 are coupled to a remote coupler 23 that is fluidly coupled to the hydraulic system 21, fluidly coupling the hoses 29 to the hydraulic system 21 via the remote coupler 23.

In known remote couplers, there is often a door assembly that is used to cover hookups to the hydraulic system. When no hose is connected to a hookup, the door covers the hookup to reduce the risk of contaminations entering the coupler. While such door assemblies are effective, the doors are often damaged during opening and closing. The damage can result in the doors getting removed or stuck, which can allow contaminants into the coupler or make it difficult to hook hoses to the coupler.

To address some of the previously described issues, and referring now to FIGS. 2-8, an exemplary embodiment of a door assembly 200 that can be incorporated as part of the remote coupler 23 is illustrated. The door assembly 200 includes a mounting plate 210, a door 220 rotatably coupled to the mounting plate 210, and a locking assembly 230 associated with the door 220. The mounting plate 210 includes a door opening 211 and an actuator opening 212, which will be described further herein. The mounting plate 210 can be associated with one or multiple hookups of the remote coupler 23. In the illustrated embodiment, for example, the mounting plate 210 has a pair of door openings 211 and a pair of actuator openings 212 so the mounting plate 210 can be used with a pair of hookups of the remote coupler 23.

The door 220 is rotatably coupled to the mounting plate 210 and is movable between a covering position (illustrated in dashed lines in FIG. 7) where the door 220 covers the door opening 211 and an open position (best illustrated in solid lines in FIG. 7) where the door opening 211 is uncovered. The door 220 may be rotatable about a screw 221 that is disposed in the actuator opening 212. When the door 220 covers the door opening 211, dust and other contaminants may be prevented from traveling through the door opening 211 and into the hydraulic system 21. The door 220 being in the covering position can also prevent a hose 29 from coupling to the hydraulic system 21. Each of the door openings 211 may be sized to correspond to one or more of the hoses 29 so the hose 29 can be inserted in the door opening 211 when the door opening 211 is uncovered and connect to the hydraulic system 21. Thus, a hose 29 can be fluidly coupled to the hydraulic system 21 via the remote coupler 23 when the door 220 is in the open position and the door opening 211 is uncovered to accept a hose 29.

The locking assembly 230 is associated with the door 220 and affects movement of the door 220 with respect to the mounting plate 210, especially with respect to the door opening 211. The locking assembly 230 includes an actuator 231, a biaser 232 associated with the actuator 231, an energizer 233 associated with the actuator 231, and a lock 234. It should be appreciated that while the locking assembly 230 is illustrated and described herein as being associated with the door 220, in some embodiments the locking assembly 230 is provided separately from the door 220.

Figure 8:
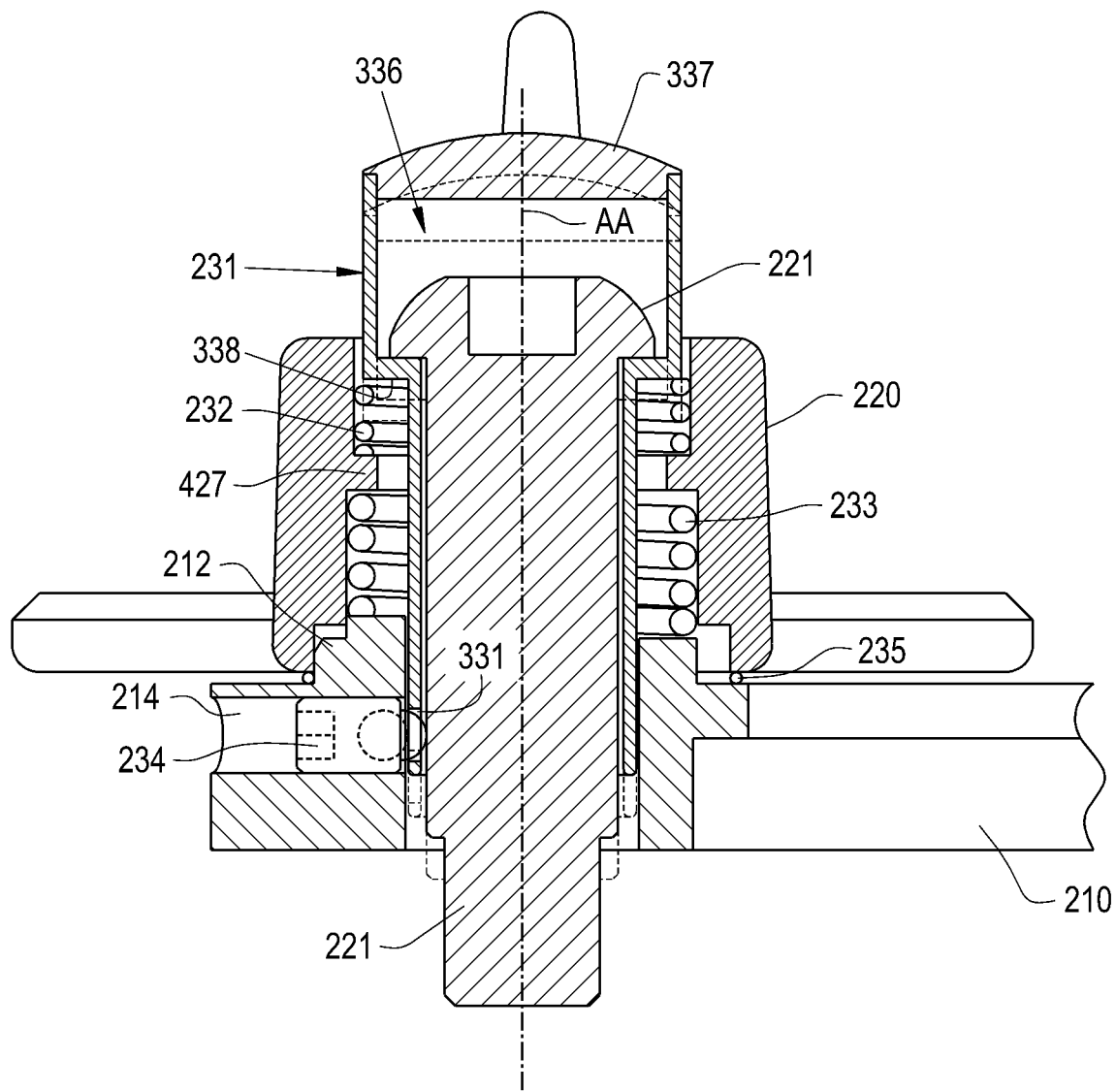
FIG. 8 illustrates a cross-sectional view of the door assembly of FIG. 7 taken along line 8-8.

The actuator 231 defines an actuator axis AA and is linearly movable in the actuator opening 212 between a first position, best illustrated in solid lines in FIG. 8, and a second position, best illustrated in dashed lines in FIG. 8. As can be appreciated from FIG. 8, the actuator 231 can be linearly moved downward, e.g., pushed down, from the first position to the second position, the significance of which will be described further herein. The actuator 231 is also rotatable about the actuator axis AA between a first locking orientation and a second locking orientation, which will be described further herein. The actuator 231 includes a first locking feature 331 and a second locking feature 332, best illustrated in FIG. 3. Each of the locking features 331, 332 may be formed, for example, as locking openings, i.e., the first locking feature 331 may be a first locking opening and the second locking feature 332 may be a second locking opening. In some embodiments, the locking features 331, 332 are aligned on a circumference extending about the actuator axis AA. The actuator 231 may be formed to include a first cylindrical section 333 and a second cylindrical section 334 that is coupled to the first cylindrical section 333. The second cylindrical section 334 may have a smaller diameter than the first cylindrical section 333 and each of the locking features 331, 332 may be formed in the second cylindrical section 334. In some embodiments, the first cylindrical section 333 has a protrusion 335 that extends radially relative to the actuator axis AA. The actuator 231 may be generally hollow so the actuator 231 defines a screw cavity 336 that is sized to accept the screw 221, as best illustrated in FIG. 8, with the actuator 231 being configured to rotate about the screw 221. A cap 337 may be placed at the opening of the screw cavity 336 to close the screw cavity 336 and reduce the risk of dirt and other contaminants entering the screw cavity 336 while also limiting access to the screw 221.

Figure 4A:
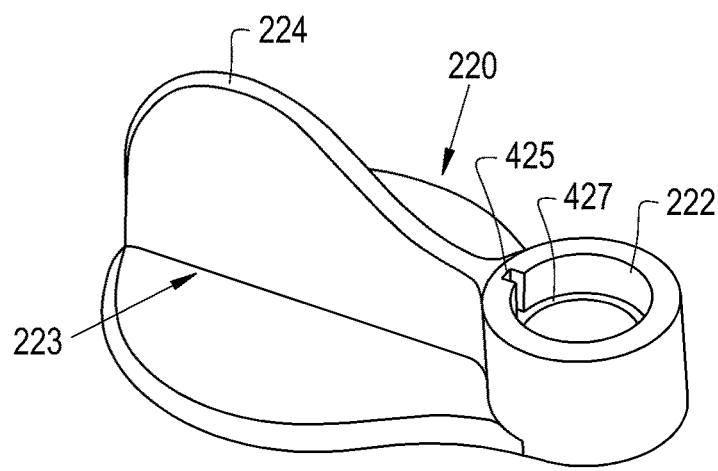
FIG. 4A illustrates a perspective view of an exemplary embodiment of a door of the door assembly of FIG. 2.
Figure 4B:
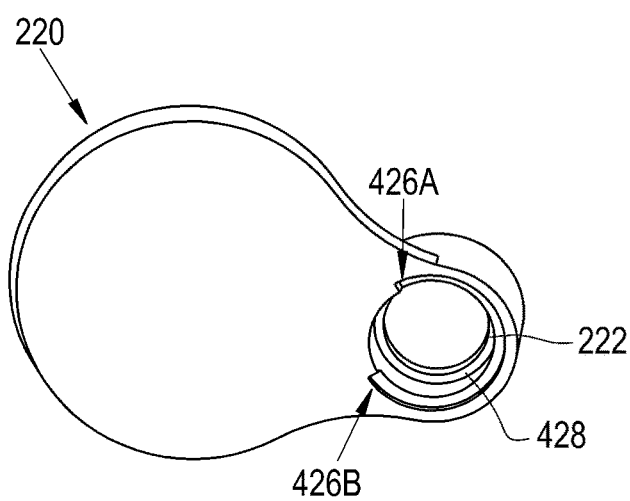
FIG. 4B illustrates another perspective view of the door of FIGS. 2 and 4A.
Figure 6:
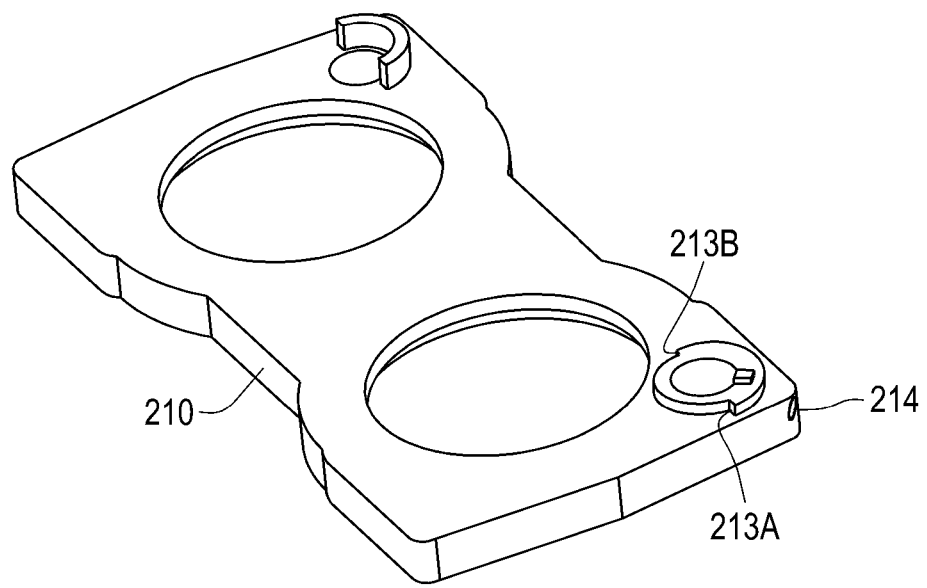
FIG. 6 illustrates a perspective view of an exemplary embodiment of a mounting plate of the door assembly of FIG. 2.
Figure 7:
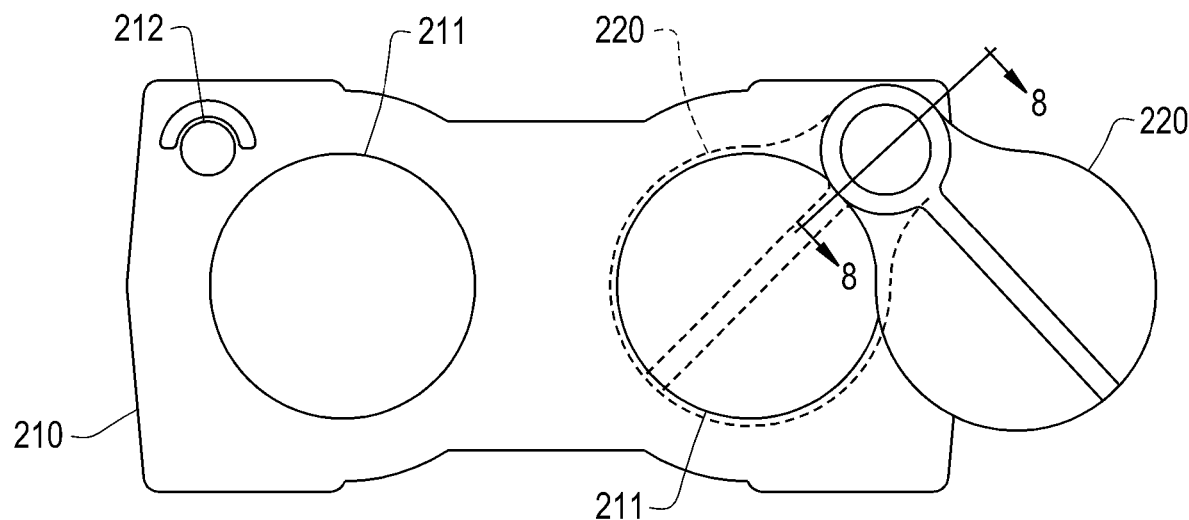
FIG. 7 illustrates a top view of the door assembly of FIG. 2 when the door is in an open position.

The door 220, which is illustrated by itself in FIGS. 4A and 4B, may include a door actuator opening 222 in which the actuator 231 is disposed. The actuator 231 may be linearly movable in the door actuator opening 222 so the actuator 231 can linearly move from the first position to the second position within the door actuator opening 222. The screw 221 may also be disposed in the door actuator opening 222. The door actuator opening 222 may be aligned with the actuator opening 212 of the mounting plate 210 so the actuator 231 and the screw 221 are also at least partially disposed in the actuator opening 212. The door 220 may also include a gripping section 223 that includes a fin 224 that is ergonomically shaped and sized to be grasped by a user for rotating the door 220. In some embodiments, the door 220 includes a protrusion slot 425 that is shaped and sized to hold the protrusion 335 of the actuator 231. By placing the protrusion 335 of the actuator 231 in the protrusion slot 425, the actuator 231 can be coupled to the door 220 so rotation of the actuator 231 causes rotation of the door 220, and vice versa. In some embodiments, the door 220 is in the covering position when the actuator 231 is in the first locking orientation and the door 220 is in the open position when the actuator 231 is in the second locking orientation, as will be described further herein. The door 220 may also include a pair of seats 426A, 426B on a bottom of the door 220 that are configured to interact with corresponding stops 213A, 213B formed on the mounting plate 210 to limit rotation of the door 220 with respect to the mounting plate 210, preventing over-rotation of the door 220.

The biaser 232 is associated with the actuator 231 and configured to bias the actuator 231 toward the first position. The biaser 232 may, for example, be a compression spring that abuts against a shoulder 338 of the actuator 231 that is formed where the first cylindrical section 333 meets the second cylindrical section 334. The biaser 232 may be disposed in the door actuator opening 222 between the shoulder 338 of the actuator 231 and a ledge 427 formed in the door actuator opening 222 so the biaser 232 can be compressed between the shoulder 338 and the ledge 427 when the actuator 231 moves toward the second position. In some embodiments, compression of the biaser 232 activates the biaser 232, i.e., causes the biaser 232 to bias the actuator 231 towards the first position, so linear movement of the actuator 231 towards the second position also activates the biaser 232, but it should be appreciated that the biaser 232 may also be activated when the actuator 231 is in the first position. In some embodiments, the screw 221 holds the actuator 231 in place so the biaser 232 does not cause the actuator 231 to excessively travel in one direction while the ledge 427 and biaser 232 prevent excessive travel of the actuator 231 in the opposite direction.

The energizer 233 is associated with the actuator 231 and configured to bias the actuator 231 toward the first locking orientation when the actuator 231 is in the second locking orientation. In other words, the energizer 233 is configured to rotate the actuator 231 about the actuator axis AA. The energizer 233 may be, for example, a torsion spring that is coupled to the actuator 231 so the torsion spring 233 is energized by the actuator 231 rotating from the first locking orientation to the second locking orientation. When the energizer 233 is energized, the energizer 233 will tend to spontaneously cause the actuator 231 to rotate about the actuator axis AA from the second locking orientation towards the first locking orientation. The energizer 233 may be disposed in the door actuator opening 222 on an energizer ledge 428 to hold the energizer 233 in place as the actuator 231 linearly moves. It should be appreciated that, in some embodiments, the energizer 233 is energized without needing the actuator 231 to rotate from the first locking orientation to the second locking orientation.

The lock 234 is configured to engage the first locking feature 331 when the actuator 231 is in the first locking orientation and engage the second locking feature 332 when the actuator 231 is in the second locking orientation. By engaging the respective locking feature 331, 332, the lock 234 causes the actuator 231 to resist rotation about the actuator axis AA and helps keep the actuator 231 in the respective locking orientation. The lock 234 may be disposed, for example, in a lock cavity 214 formed in the mounting plate 210 adjacent to the actuator opening 212.

The lock 234 may be, for example, a ball plunger that is spring-loaded and can be forced out of the respective locking feature 331, 332 upon a sufficient force being applied to the lock 234. The lock 234 can thus hold the actuator 231 in the second locking orientation, which may correspond to the door 220 being in the open position, so the door 220 remains in the open position to allow a hose 29 to couple to the hydraulic system 21.

As previously described, the actuator 231 is configured to linearly move from the first position to the second position. Linear movement of the actuator 231 from the first position to the second position while the actuator 231 is in the second locking orientation causes the lock 234 to disengage from the second locking feature 332. Linear movement of the actuator 231 may, for example, cause the ball of the lock 234 to be depressed inwardly until the ball of the lock 234 comes out of the second locking feature 332 and instead bears against the outer surface of the actuator 231. When the lock 234 is disengaged from the second locking feature 332, as well as the first locking feature 331, the actuator 231 is generally free to rotate about the actuator axis AA. When the actuator 231 is free to rotate about the actuator axis AA due to the lock 234 being disengaged from the second locking feature 332, but not in the first locking orientation, the energizer 233 rotates the actuator 231 towards the first locking orientation. As the energizer 233 rotates the actuator 231 towards the first locking orientation, the door 220 also rotates towards the covering position. Thus, the lock 234 can hold the door 220 in the open position by engaging the second locking feature 332 when the door 220 is rotated to the open position while also allowing the door 220 to rotate back to the covering position by linearly moving the actuator 231 to the second position, e.g., by pressing down on the actuator 231. When the actuator 231 returns to the first locking orientation, the lock 234 can engage the first locking feature 331 so the actuator 231 is not freely rotatable; a user must exert a sufficient rotational force on the door 220 and coupled actuator 231 to then rotate the actuator 231 to the second locking orientation so the lock 234 engages the second locking feature 332. The previously described stops 213A, 213B of the mounting plate 210 can prevent over-rotation of the actuator 231, and be positioned so the seats 426A, 426B of the door 220 engage the respective stop 213A, 213B when the actuator 231 is in the first locking orientation and the second locking orientation. The arrangement of the door assembly 200 thus provides an easy and convenient way to rotate the door 220 from the covering position to the open position and release the door 220 from the open position so the door 220 spontaneously returns to the covering position.

In some embodiments, the locking assembly 230 includes a brake 235 that is associated with the actuator 231 and configured to impede rotation of the actuator 231 toward the first locking orientation from the second locking orientation when the lock 234 is disengaged from the second locking feature 332. By incorporating the brake 235, the speed of rotation of the actuator 231 from the second locking orientation to the first locking orientation is reduced compared to free rotation of the actuator 231. Similarly, the speed of the door 220 rotating from the open position to the covering position is reduced, which can reduce the risk of the door 220 being broken. The brake 235 may include, for example, one or more rings of material that are configured to impede rotation of the actuator 231 due to friction. The brake 235 may be disposed between the door 220 and, for example, a portion of the mounting plate 210 so the brake 235 is statically held by the mounting plate 210, creating friction between the brake 235 and the door 220 that opposes rotation of the actuator 231. It should thus be appreciated that the brake 235 can reduce the rotational speed of the actuator 231 and the door 220 to reduce the risk of the door 220 being damaged as the door 220 rotates from the open position to the covering position.

From the foregoing, it should be appreciated that the door assembly 200 including the locking assembly 230 provided according to the present disclosure has a door 220 that can be easily and conveniently moved from the covering position to the open position, allowing a hose 29 to be inserted in the door opening 211, before being returned to the covering position by pressing on the actuator 231. The lock 234 holds the actuator 231 in the second locking orientation and the door 220 in the open position so the door 220 is not forced into a hose 29 inserted in the door opening 211, reducing the risk of the door 220 being broken, while also allowing the door 220 to be returned to the covering position when the hose 29 is removed by pressing down on the actuator 231. The brake 235 can slow down the return speed of the door 220 to the covering position, further reducing the risk of the door 220 breaking. Thus, the present disclosure provides a way to reduce the risk of the door 220 breaking while also providing a convenient and easy way to move the door 220 between the open position and the covering position.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A door assembly for an agricultural vehicle, the door assembly comprising:
   a mounting plate comprising a door opening and an actuator opening;
   a door rotatably coupled to the mounting plate and movable between a covering position where the door covers the door opening and an open position where the door opening is uncovered; and
   a locking assembly associated with the door, the locking assembly comprising:
      an actuator that defines an actuator axis, the actuator being linearly movable in the actuator opening between a first position and a second position and rotatable about the actuator axis between a first locking orientation and a second locking orientation, the actuator comprising a first locking feature and a second locking feature;
      a biaser associated with the actuator and configured to bias the actuator toward the first position;
      an energizer associated with the actuator and configured to bias the actuator toward the first locking orientation when the actuator is in the second locking orientation; and
      a lock configured to engage the first locking feature when the actuator is in the first locking orientation and engage the second locking feature when the actuator is in the second locking orientation, wherein linear movement of the actuator from the first position to the second position while the actuator is in the second locking orientation causes the lock to disengage from the second locking feature so the energizer rotates the actuator towards the first locking orientation.

2. The door assembly of claim 1, further comprising a brake associated with the actuator and configured to impede rotation of the actuator toward the first locking orientation from the second locking orientation when the lock is disengaged from the second locking feature.

3. The door assembly of claim 2, wherein the brake comprises a ring of material configured to impede rotation of the actuator due to friction.

4. The door assembly of claim 1, wherein the actuator is coupled to the door such that the door is in the covering position when the actuator is in the first locking orientation and the door is in the open position when the actuator is in the second locking orientation.

5. The door assembly of claim 4, wherein the door comprises a door actuator opening that is aligned with the actuator opening of the mounting plate, wherein the actuator is linearly movable in the door actuator opening.

6. The door assembly of claim 5, wherein the biaser is disposed in the door actuator opening.

7. The door assembly of claim 5, wherein the door comprises a protrusion slot and the actuator comprises a protrusion disposed in the protrusion slot that extends radially relative to the actuator axis.

8. The door assembly of claim 1, wherein the lock comprises a ball plunger, the first locking feature comprises a first locking opening, and the second locking feature comprises a second locking opening.

9. The door assembly of claim 1, wherein the energizer comprises a torsion spring that is coupled to the actuator so the torsion spring is energized by the actuator rotating from the first locking orientation to the second locking orientation.

10. An agricultural vehicle, comprising:
a chassis;
a hydraulic system carried by the chassis and configured to output pressurized hydraulic fluid; and
a remote coupler fluidly coupled to the hydraulic system, the remote coupler comprising a door assembly comprising:
a mounting plate comprising a door opening and an actuator opening;
a door rotatably coupled to the mounting plate and movable between a covering position where the door covers the door opening and an open position where the door opening is uncovered; and
a locking assembly associated with the door, the locking assembly comprising:
an actuator that defines an actuator axis, the actuator being linearly movable in the actuator opening between a first position and a second position and rotatable about the actuator axis between a first locking orientation and a second locking orientation, the actuator comprising a first locking feature and a second locking feature;
a biaser associated with the actuator and configured to bias the actuator toward the first position;
an energizer associated with the actuator and configured to bias the actuator toward the first locking orientation when the actuator is in the second locking orientation; and
a lock configured to engage the first locking feature when the actuator is in the first locking orientation and engage the second locking feature when the actuator is in the second locking orientation, wherein linear movement of the actuator from the first position to the second position while the actuator is in the second locking orientation causes the lock to disengage from the second locking feature so the energizer rotates the actuator towards the first locking orientation.

11. The agricultural vehicle of claim 10, further comprising a brake associated with the actuator and configured to impede rotation of the actuator toward the first locking orientation from the second locking orientation when the lock is disengaged from the second locking feature.

12. The agricultural vehicle of claim 11, wherein the brake comprises a ring of material configured to impede rotation of the actuator due to friction.

13. The agricultural vehicle of claim 10, wherein the actuator is coupled to the door such that the door is in the covering position when the actuator is in the first locking orientation and the door is in the open position when the actuator is in the second locking orientation.

14. The agricultural vehicle of claim 13, wherein the door comprises a door actuator opening that is aligned with the actuator opening of the mounting plate, wherein the actuator is linearly movable in the door actuator opening.

15. The agricultural vehicle of claim 14, wherein the biaser is disposed in the door actuator opening.

16. The agricultural vehicle of claim 14, wherein the door comprises a protrusion slot and the actuator comprises a protrusion disposed in the protrusion slot that extends radially relative to the actuator axis.

17. The agricultural vehicle of claim 10, wherein the lock comprises a ball plunger, the first locking feature comprises a first locking opening, and the second locking feature comprises a second locking opening.

18. The agricultural vehicle of claim 10, wherein the energizer comprises a torsion spring that is coupled to the actuator so the torsion spring is energized by the actuator rotating from the first locking orientation to the second locking orientation.

19. The agricultural vehicle of claim 10, wherein the door opening is configured to accept a hose when the door is in the open position.

20. A locking assembly for a door assembly of an agricultural vehicle, the locking assembly comprising:
an actuator that defines an actuator axis, the actuator being linearly movable between a first position and a second position and rotatable about the actuator axis between a first locking orientation and a second locking orientation, the actuator comprising a first locking feature and a second locking feature;
a biaser associated with the actuator and configured to bias the actuator toward the first position;
an energizer associated with the actuator and configured to bias the actuator toward the first locking orientation when the actuator is in the second locking orientation; and
a lock configured to engage the first locking feature when the actuator is in the first locking orientation and engage the second locking feature when the actuator is in the second locking orientation, wherein linear movement of the actuator from the first position to the second position while the actuator is in the second locking orientation causes the lock to disengage from the second locking feature so the energizer rotates the actuator towards the first locking orientation.

* * * * *